US011122155B2

(12) United States Patent
Mok et al.

(10) Patent No.: US 11,122,155 B2
(45) Date of Patent: *Sep. 14, 2021

(54) DISPLAY SYSTEM WITH A FLEXIBLE DISPLAY

(71) Applicant: Samsung Electronics Co., Ltd., Suwon-si (KR)

(72) Inventors: Kwok Wah Mok, Eindhoven (NL); Noortje Grundlehner-Bos, Eindhoven (NL); Volker Barnhart Verschoor, Eindhoven (NL); Robert Sjang Josine Van Dijk, Eindhoven (NL); Johannes Cornelis Adriaan Hamers, Eindhoven (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,430

(22) Filed: May 15, 2020

(65) Prior Publication Data
US 2020/0280624 A1 Sep. 3, 2020

Related U.S. Application Data

(60) Continuation of application No. 16/181,924, filed on Nov. 6, 2018, now Pat. No. 10,659,584, which is a
(Continued)

(51) Int. Cl.
*G06F 5/00* (2006.01)
*H04M 1/02* (2006.01)
(Continued)

(52) U.S. Cl.
CPC ........ *H04M 1/0268* (2013.01); *G06F 1/1652* (2013.01); *G06F 1/1656* (2013.01);
(Continued)

(58) Field of Classification Search
USPC ........................... 361/679.3, 679.27; 349/58
See application file for complete search history.

(56) References Cited

U.S. PATENT DOCUMENTS

| 6,044,473 A | 3/2000 | Kim |
| 6,377,324 B1 | 4/2002 | Katsura |
| (Continued) | | |

FOREIGN PATENT DOCUMENTS

| CN | 1452040 A | 10/2003 |
| CN | 102037425 A | 4/2011 |
| (Continued) | | |

OTHER PUBLICATIONS

European Examination Report dated Feb. 20, 2019, issued in European Patent Application No. 13179221.0.
(Continued)

*Primary Examiner* — Bradley Duckworth
(74) *Attorney, Agent, or Firm* — Jefferson IP Law, LLP

(57) ABSTRACT

A display system includes a continuous flexible display, two book halves, two main display supports, and a movement synchronizing coupling. The two book halves is connected to each other via a hinge mechanism. The hinge mechanism has two hinges, and each hinge is rotatable about respective axis. Each of the two main display supports connects to one of the two book halves and is configured to support the flexible display. The coupling is connected to the two main display supports and rotating about a rotation axis that is parallel to the axis of hinge to enable a synchronized movement of the two main display supports.

8 Claims, 14 Drawing Sheets

Related U.S. Application Data continuation of application No. 15/608,221, filed on May 30, 2017, now Pat. No. 10,154,124, which is a division of application No. 14/586,792, filed on Dec. 30, 2014, now Pat. No. 9,696,763, which is a division of application No. 13/569,080, filed on Aug. 7, 2012, now Pat. No. 8,971,031.

(51) Int. Cl.
  *G09F 9/30* (2006.01)
  *G06F 1/16* (2006.01)
(52) U.S. Cl.
  CPC ............ *G06F 1/1681* (2013.01); *G09F 9/301* (2013.01); *H04M 1/0216* (2013.01)

(56) References Cited

U.S. PATENT DOCUMENTS

| | | | |
|---|---|---|---|
| 6,577,496 B1 | 6/2003 | Gioscia et al. | |
| 6,867,961 B2 | 3/2005 | Choi | |
| 8,289,688 B2 | 10/2012 | Behar et al. | |
| 8,379,378 B2 | 2/2013 | Visser et al. | |
| 8,599,546 B2 | 12/2013 | Nagasaki | |
| 8,605,421 B2 | 12/2013 | Verschoor et al. | |
| 8,624,844 B2 | 1/2014 | Behar et al. | |
| 8,971,031 B2 | 3/2015 | Mok et al. | |
| 9,563,229 B2 | 2/2017 | Behar et al. | |
| 9,696,763 B2 | 7/2017 | Mok et al. | |
| 10,154,124 B2 | 12/2018 | Mok et al. | |
| 10,659,584 B2 * | 5/2020 | Mok | G06F 1/1652 |
| 2003/0193773 A1 | 10/2003 | Choi | |
| 2005/0122671 A1 | 6/2005 | Homer | |
| 2006/0146488 A1 | 7/2006 | Kimmel | |
| 2008/0232043 A1 | 9/2008 | Wang | |
| 2009/0000062 A1 | 1/2009 | Yamanami | |
| 2009/0244012 A1 | 10/2009 | Behar et al. | |
| 2009/0244832 A1 | 10/2009 | Behar et al. | |
| 2009/0267872 A1 | 10/2009 | Silverbrook | |
| 2010/0164837 A1 | 7/2010 | Kao et al. | |
| 2010/0246103 A1 | 9/2010 | Visser et al. | |
| 2012/0057280 A1 | 3/2012 | Hoshino | |
| 2012/0092567 A1 | 4/2012 | Jikuya et al. | |
| 2012/0176740 A1 | 7/2012 | Nagasaki | |
| 2013/0021762 A1 | 1/2013 | Van Dijk | |
| 2013/0037228 A1 | 2/2013 | Verschoor et al. | |
| 2013/0044410 A1 | 2/2013 | Verschoor et al. | |
| 2013/0111704 A1 | 5/2013 | Mitsui | |
| 2013/0141854 A1 | 6/2013 | Behar et al. | |
| 2013/0342094 A1 | 12/2013 | Walters et al. | |
| 2014/0029190 A1 | 1/2014 | Sato et al. | |
| 2017/0205849 A1 | 7/2017 | Behar et al. | |

FOREIGN PATENT DOCUMENTS

| | | |
|---|---|---|
| EP | 1 635 313 A2 | 3/2006 |
| KR | 10-2012-0049762 A | 5/2012 |
| WO | 2012/008420 A1 | 1/2012 |

OTHER PUBLICATIONS

European Search Report dated Apr. 9, 2020, issued in European Patent Application No. 19210057.6.
European Examination Report dated May 14, 2021, issued in European Patent Application No. 19 210 057.6.

\* cited by examiner

DISPLAY SYSTEM WITH A FLEXIBLE DISPLAY

CROSS-REFERENCE TO RELATED APPLICATION(S)

This application is a continuation application of prior application Ser. No. 16/181,924, filed on Nov. 6, 2018, which application is a continuation application of prior application Ser. No. 15/608,221, filed on May 30, 2017 which has issued as U.S. Pat. No. 10,154,124 on Dec. 11, 2018, which is a divisional application of prior application Ser. No. 14/586,792, filed on Dec. 30, 2014 which has issued as U.S. Pat. No. 9,696,763 on Jul. 4, 2017, which is a divisional application of prior application Ser. No. 13/569,080, filed on Aug. 7, 2012 which has issued as U.S. Pat. No. 8,971,031 on Mar. 3, 2015, the entire disclosure of each of which is hereby incorporated by reference.

FIELD OF INVENTION

The present invention generally relates to flexible displays. The present invention specifically relates to flexible displays provided with display supports.

DESCRIPTION OF PRIOR ART

A number of product concepts have been developed for flexible/rollable displays with a pair of display supports mutually connected by a hinge mechanism. Examples of these concepts are the 'book' and the 'wrap', a 'wrap' concept is shown in WO 2008/054206 A2.

The 'book' concept is the simplest implementation of a rollable display comprising two hingeably connected supports with a continuous display. In the middle near the hinge mechanism is a hollow space to accommodate the curved segment of the display in the situation where the 'book' is in the closed position. The display size is at most twice the size of the closed display system. In practice, it will be around 1.8× the size due to the bezel of the support halves needed around the display.

The 'wrap' concept comprises a display with two hingeably connected supports, wrapped in the closed position with its front side to the inside. In the known concept the display makes one complete turn around the device body when wrapped. Therefore, the size of the display is about twice the size of the device. For larger displays compared to the device body more turns are required, which adds mechanical complexity.

In these concepts each hinge mechanism comprises two hinges being mutually located at a distance. In practice for these concepts a double hinge mechanism is preferred above a single hinge mechanism. A double hinge mechanism shows the advantage of a smaller width of the display system (measured in closed position), whereas in the open position the hinge shafts are located below the flexible display. Each of the pair of hinges is configured for substantially 90° rotation of a respective one of the display supports, whereas the display supports are rotatable between a configuration for fixing the flexible display in a closed storage position and a planar configuration for fixing the flexible display in an open position. If during movement to the open position the user rotates one of the display supports with respect to the hinge mechanism over an angle substantially larger than the other display support, this difference between the rotations can result in problems with the flexible/rollable display in the area of the hinge mechanism. In this area locally the internal stress in the layers of the display may become too high and/or the display may be curved into a curvature at a too small radius. Such excessive stress and/or too small radius curvature creation may damage the display and decrease the lifetime of the display.

It is an object of the invention to prevent local excessive stress in the flexible display as well as curvature at a too small radius during movement of the display between closed and open position. It is also an object to improve the lifetime of the display.

DISCLOSURE OF THE INVENTION

According to one aspect the invention provides a display system comprising:
a continuous flexible display,
at least two frame parts, each housing a main display support, said supports being hingeable with respect to each other and each structurally configured to support a respective portion of the flexible display, wherein the two main display supports are rotatable in opposite directions, connected to each other by a hinge mechanism comprising two hinges being mutually located at a distance, each of the hinges being configured for rotation of a respective one of the main display supports, the main display supports being rotatable between a configuration for fixing the flexible display in a closed storage position and a planar configuration for fixing the flexible display in an open position, wherein the two main display supports are coupled to each other by a movement synchronizing coupling, said coupling enabling during movement between the closed and open position a mutual substantially synchronized rotating of the main display supports at substantially equal but oppositely directed angles.

Due to this synchronized rotating of the main display supports at substantially equal angles, excessive local stress in the display and/or a curvature at a too small radius in the display will be prevented, thus improving the lifetime of the display. Another advantage of the display system in accordance with the invention is the comfortable synchronized movement of both display supports, giving the user the feeling of opening with rotation around only one hinge. A further advantage is the stable positioning of the main display supports in the open and closed position, making additional locking action superfluous for the user in these positions of the display system.

According to another aspect the invention provides a display system wherein the movement synchronizing coupling that comprises spring means providing spring forces on both main display supports to move the display system into the open or closed position respectively. Preferably the spring means are part of an over center mechanism that, due to the spring force after movement to the open respectively closed end position, stably positions the display system in either end position.

According to another aspect of the invention the movement synchronizing coupling comprises at least one pair of wheels arranged near the hinge mechanism, each being connected with a display support, said wheels being mutually coupled for rotation in opposite directions.

In a preferred embodiment the movement synchronizing coupling is coupled with at least one additional display support, configured to support substantially a segment of the flexible display located between the said respective portions of the flexible display in the open position, said additional display support being movable by the coupling with the movement synchronizing coupling with respect to the display segment between a non-operational position and a support position when the two main display supports are moved between the storage position and the open position of the flexible display, such that in the open position substantially the whole surface of the display is supported by the respective display supports.

Reference is made to the non pre-published application U.S. 61/506,177, filed Jul. 11, 2011, (herewith incorporated by reference).

DETAILED DESCRIPTION

Figure 1:
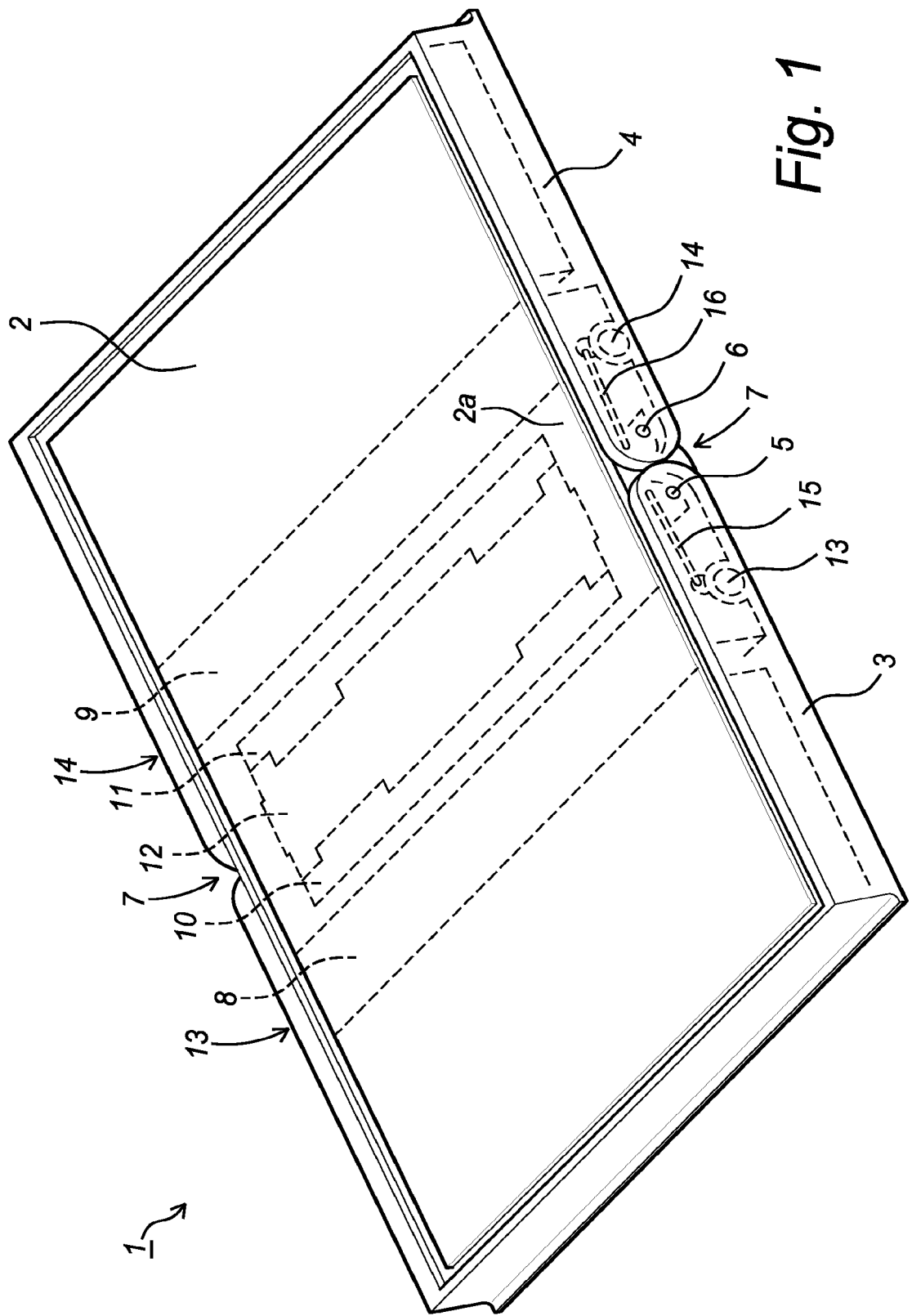
FIG. 1 shows a perspective view of a first 'book' embodiment in an open position, in accordance with the invention.
Figure 2:
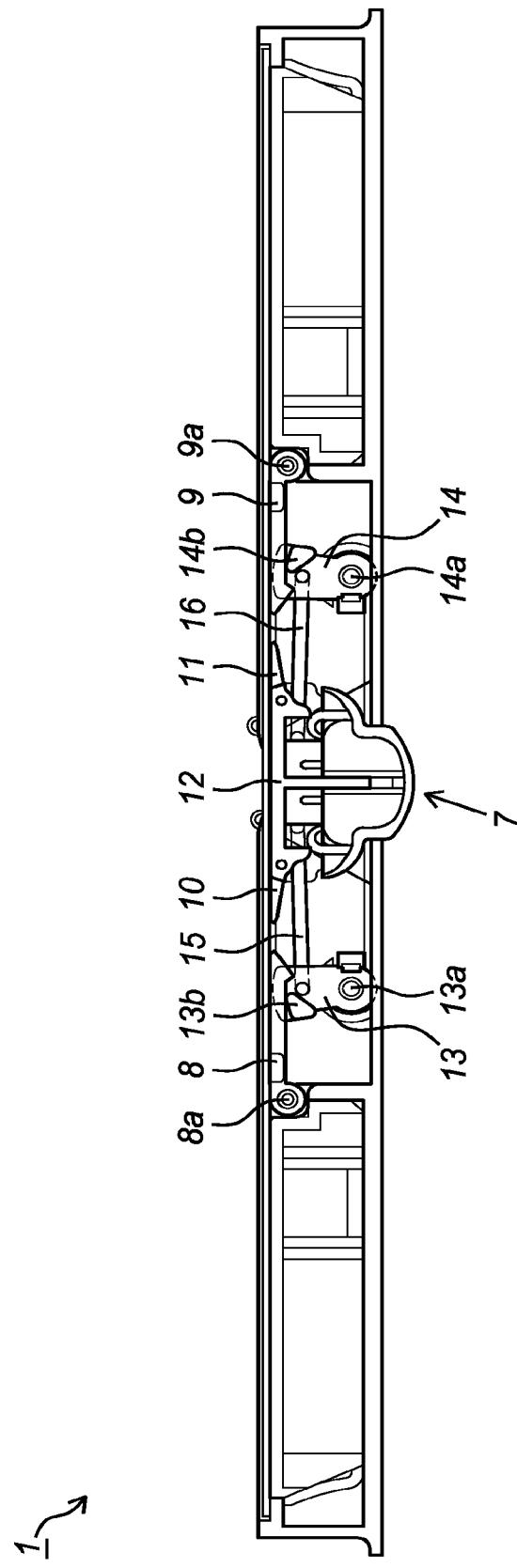
FIG. 2 shows a cross sectional view of the 'book' embodiment of FIG. 1 in an open position.
Figure 3:
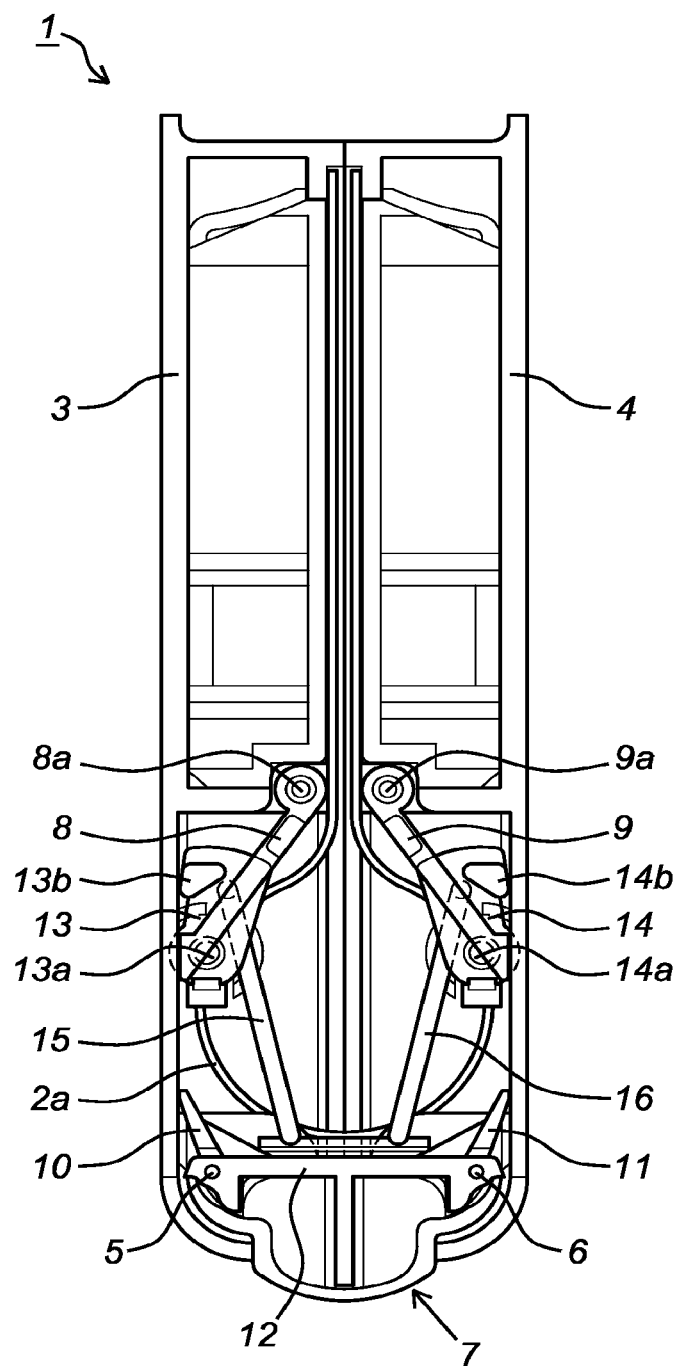
FIG. 3 shows a cross sectional view of the 'book' embodiment of FIG. 1 in a closed position.

The embodiment shown in FIG. 1 is a 'book' display system 1 with two book halves, comprising a flexible display 2, extending continuously over both halves and a support frame, comprising in each of the book halves a main display support 3, 4 respectively, being connected at both sides of the system 1 by hinges 5, 6, respectively, of a hinge mechanism 7 and each being structurally configured to support a respective portion of the flexible display 2. As shown in FIGS. 2 and 3, the two main display supports 3, 4 are mutually hingable around their hinges 5, 6 between a planar configuration (FIG. 2) for fixing the flexible display 2 in an open position and a configuration for fixing the flexible display in a closed storage position (FIG. 3).

Between the respective hinge 5, 6 and the respective display support 3, 4 first additional display supports 8, 9, are configured rotatably around axes 8a, 9a and connected with the display support 3, 4. Between the pair of first additional display supports 8, 9 a second pair of additional display supports 10, 11 are arranged linked with a central additional display support 12 and rotatable around the axis 5, 6 respectively. Together, the additional display supports 8, 9, 10, 11 and 12 in the open position close the gap created by the hinge mechanism 7 between the main supports 3, 4. Thus in the open position substantially the whole surface of a central display segment 2a located between the display supports 3, 4 is supported. These additional display supports 8, 9, 10, 11 and 12 are movably arranged in the support frame of the display system 1 with respect to the central display segment 2a between a non-operational position and a support position when the two main display supports 3, 4 are moved between the storage position and the open position of the flexible display.

In accordance with the present invention the two main display supports 3, 4 are coupled to each other by a movement synchronizing coupling, enabling during movement between the closed and open position a mutual substantially synchronized rotating of the main display supports 3, 4 at substantially equal but oppositely directed angles.

This movement synchronizing coupling comprises at both sides of the support frame a pair of cams 13, 14, rotatably mounted in the support frame around axes 13a, 14a, extending substantially parallel with the axes 5, 6. The cams are coupled with the first pair of additional display supports 8, 9 and a pair of levers 15, 16, coupled with the central additional display support 12. During movement of the main display supports 3, 4 from the position shown in FIG. 3 towards the open position of FIGS. 1, 2, the central display support is lifted up and at the same time the two linked additional supports 10, 11 are turned down around the axis 5, 6 respectively. The additional display supports 8, 9 are turned up around their axes 8a, 9a respectively and are pushed upwardly and are stably positioned in the open position of FIG. 2 by notches 13b, 14b at the cams 13, 14. All moving parts are moved to the same level to support the display segment 2a. During movement to the closed position of FIG. 3 the supports 3, 4 are closed, the central support 12 is moved down, the two additional supports 10, 11 are turned up and the other supports 8, 9 are turned down. All moving parts are moved away from the centre bottom area to increase space for the folding display storage (see FIG. 3). The movement synchronizing coupling of the cams 13, 14, the supports 8, 9, 10, 11, 12 and the levers 15, 16 enable in an effective way a mutual substantially synchronized rotating of the main display supports 3, 4 at substantially equal but opposite angles and synchronized movement of the additional display supports 8, 9, 10, 11 and 12 between their support position and non-operational position.

Due to this synchronized rotating of the main display supports at substantially equal angles, excessive local stress in the display and/or a too small radius of curvature in the display will be prevented, thus improving the lifetime of the display. Another advantage of the display system in accordance with the invention is the comfortably synchronized movement of both display supports, giving the user the feeling of opening with rotation around only one hinge. A further advantage is the stable positioning of the main display supports in the open and closed position, making additional locking actions superfluous for the user in these positions of the display system.

In the storage position of the flexible display 2 shown in FIG. 3, between the main display supports 3, 4 and the additional display supports 8, 9, 10, 11 and 12 there is sufficient free space for enabling a partial curvature of the display segment 2a without conflicting with the respective main display supports.

In the open position between display supports 3, 4 the display segment 2a is supported by the additional supports when touched. This means that damage of the display is prevented when touch functionality is added to the display. Another advantage is that sagging of the display is prevented. The display will be perceived as stiffer which gives a better quality perception of the display system.

Figure 4:
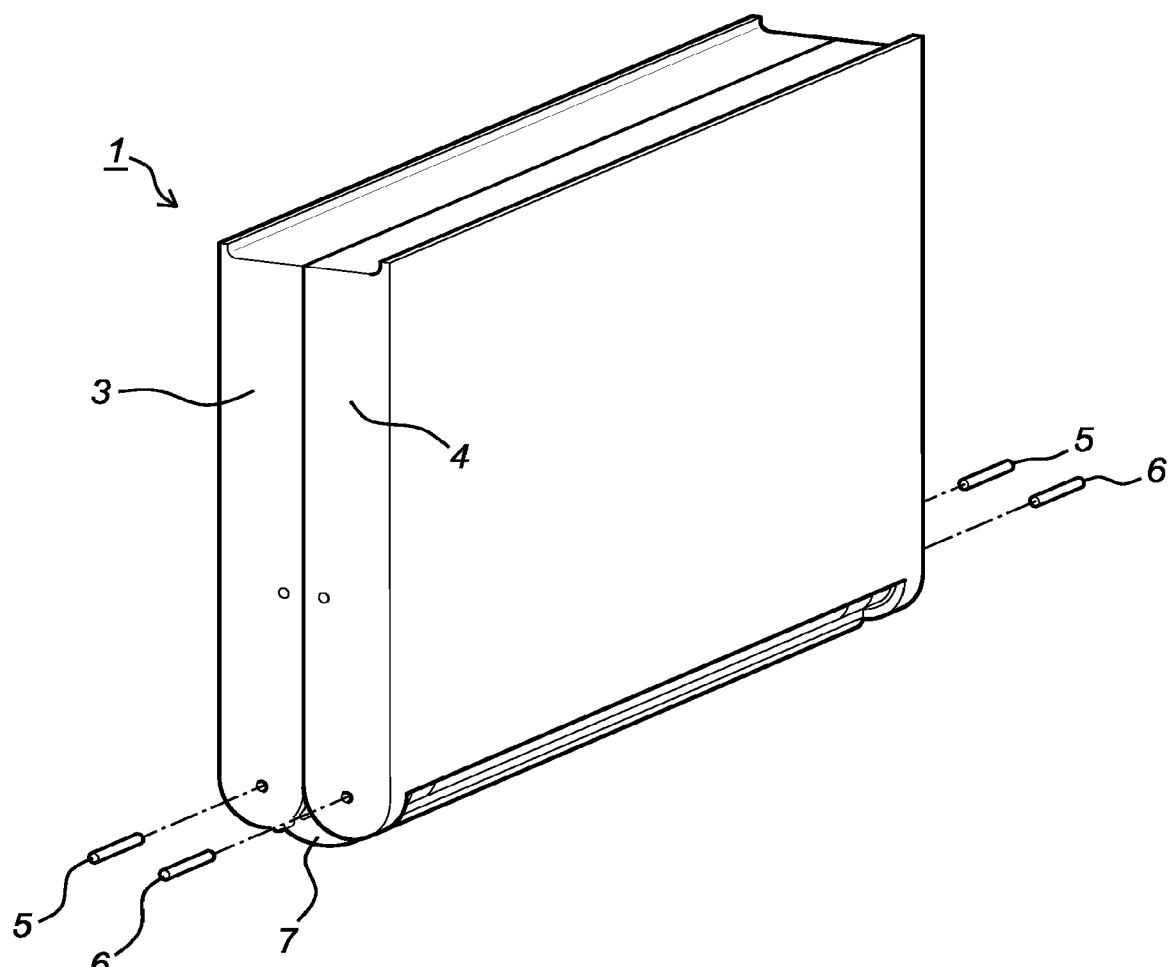
FIG. 4 shows a perspective view of a second 'book' embodiment in a closed position, accordance with the invention.
Figure 5:
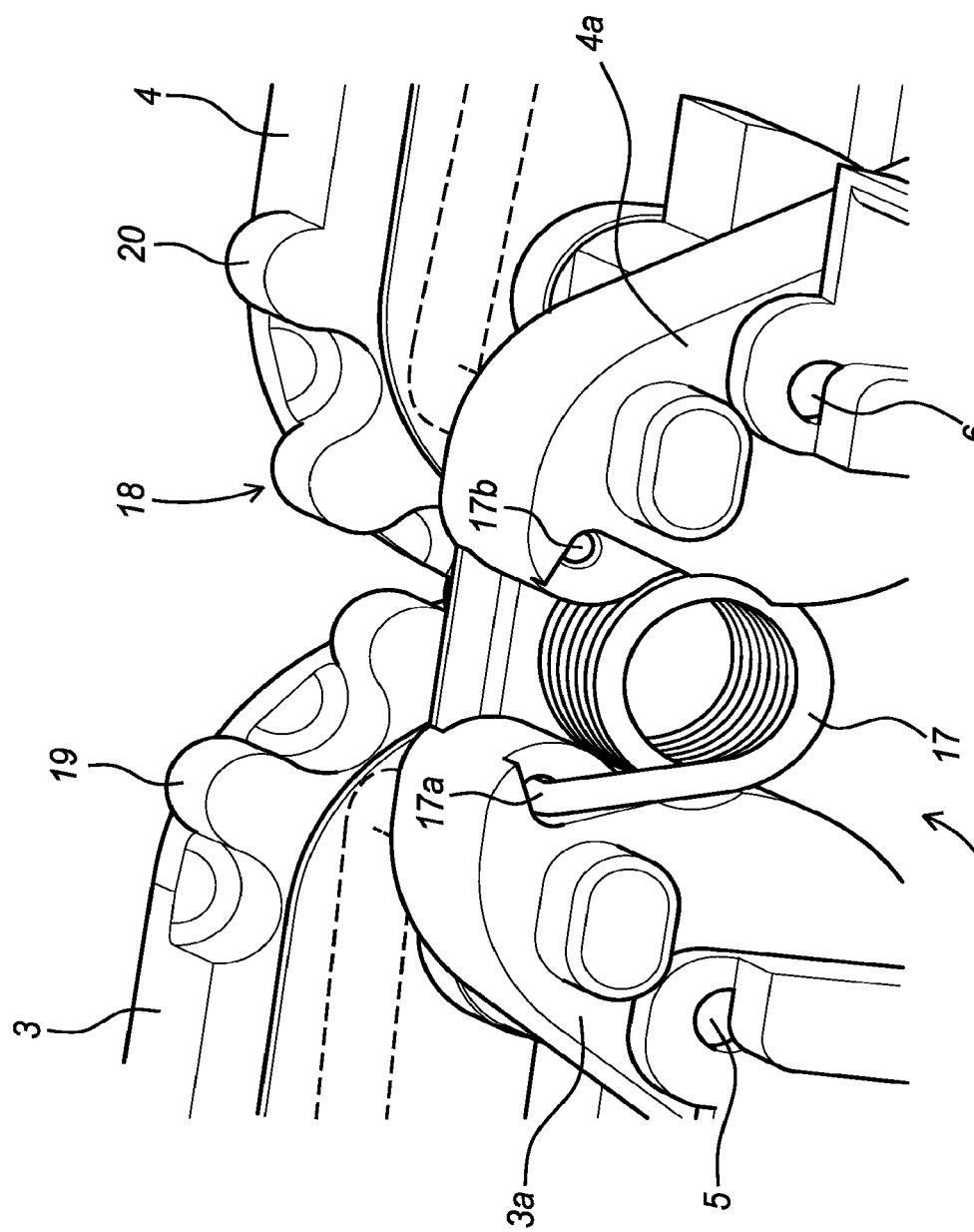
FIG. 5 shows a perspective view of part of the 'book' embodiment of FIG. 4 in an open position.
Figure 6:
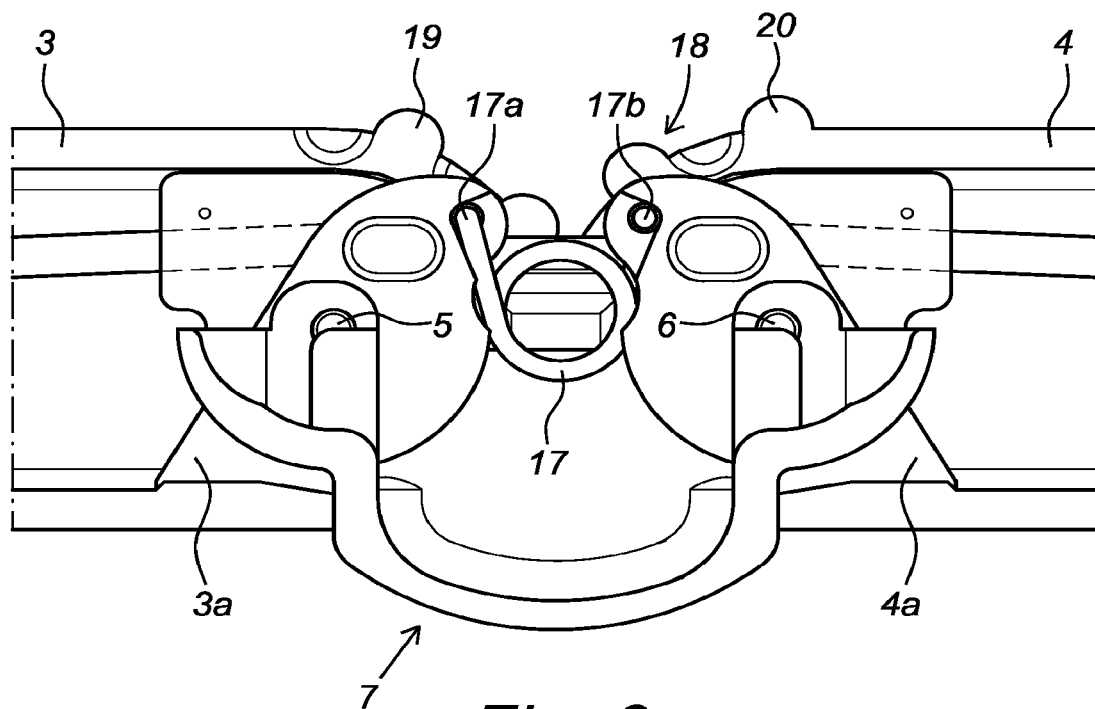
FIG. 6 shows a side view of part of the 'book' embodiment of FIG. 4 in an open position.
Figure 7:
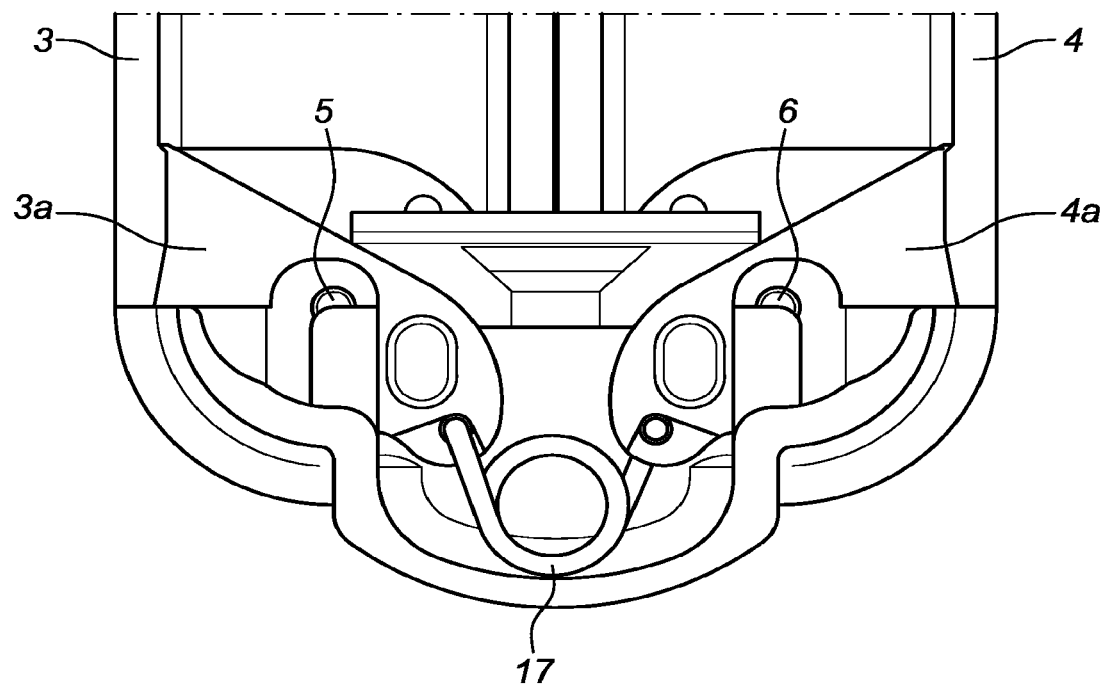
FIG. 7 shows a side view of part of the 'book' embodiment of FIG. 4 in a closed position.

Also the embodiment shown in FIGS. 4-7 is a 'book' display system 1 with a number of parts substantially identical to the number of parts of the first embodiment. It consists of a continuous flexible display 2 housed in two housing halves and a support frame, comprising two main display supports 3, 4, each located in a housing half and being connected at both sides of the system 1 by hinges 5, 6, of a hinge mechanism 7 and each structurally configured to support a respective portion of the flexible display. As shown in FIGS. 5, 6, 7 the two main display supports 3, 4 comprise arms 3a, 4a connected with hinges 5, 6 respectively. The supports are mutually hingable around their hinges 5, 6 between a planar configuration (FIGS. 5, 6) for fixing the flexible display 2 in an open position and a configuration for fixing the flexible display in a closed storage position (FIGS. 4 and 7). A difference with the first embodiment is the application at the location of both hinge mechanisms 7 of a torsion spring 17 with legs 17a, 17b connected with their free ends with the arms 3a, 4a. Each of the torsion springs 17 passes with its legs 17a, 17b during movement of the housing halves between the open and closed position through a plane comprising the axes of the hinges 5, 6 and moves from one to the other side of this plane. Thus the torsion springs act as part of an over center mechanism. The torsion springs 17 also provide spring force via the arms 3a, 4a on the main display supports 3, 4, forcing these supports to the planar configuration and via the main display supports on the central display segment 2a of the flexible display to pre-stretch the central display segment 2a at the open position. The spring forces of the two torsion springs 17 between the two book halves keep the book stably positioned in the open and closed positions.

In this embodiment the movement synchronizing coupling comprises a pair of gear mechanisms 18 with teethed segments 19, 20 on both display supports 3, 4 which are engaged to each other, enabling a synchronized rotating of the main display supports at substantially equal but oppositely directed angles and synchronized movement of the additional display supports 8, 9, 10, 11 and 12 when the two book halves are opened or closed. Due to the coupling between the legs 17a, 17b and the additional supports 8, 9, 10, 11 and 12 the springs 17 also keep these supports stably positioned in their position supporting the display segment 2a in the open position of the book halves.

Also in this embodiment of the invention, sufficient space is available for the construction of the double hinges 5, 6, two torsion springs 17 and the gear mechanisms 18 and for enabling a partial curvature of the display segment 2a in the closed position without conflicting with the respective main display supports. Preferably in this closed position the additional support plate 12 facilitates by its stable positioning a pre-defined curvature of the display segment 2a with an advantage for the lifetime of the display.

Figure 8A:
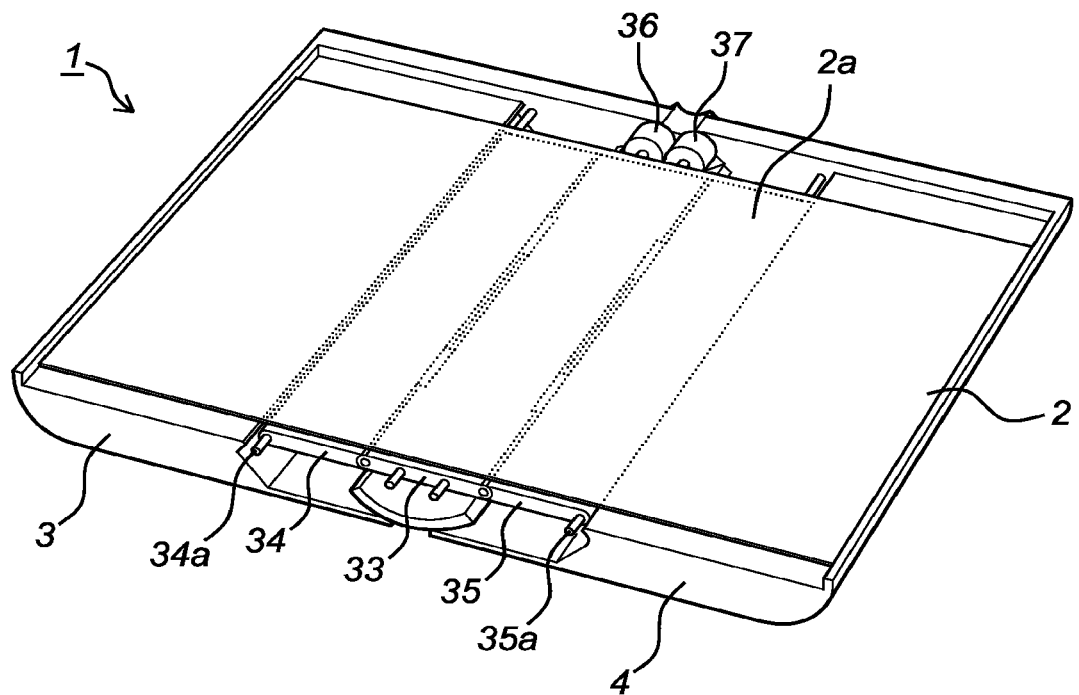
FIGS. 8a-8f show a perspective view and a schematic side view of another 'book' embodiment in an open position (FIG. 8a/b), a partial open position (FIG. 8c/d) and a storage position (FIG. 8e/f), respectively, in accordance with the invention.
Figure 8B:
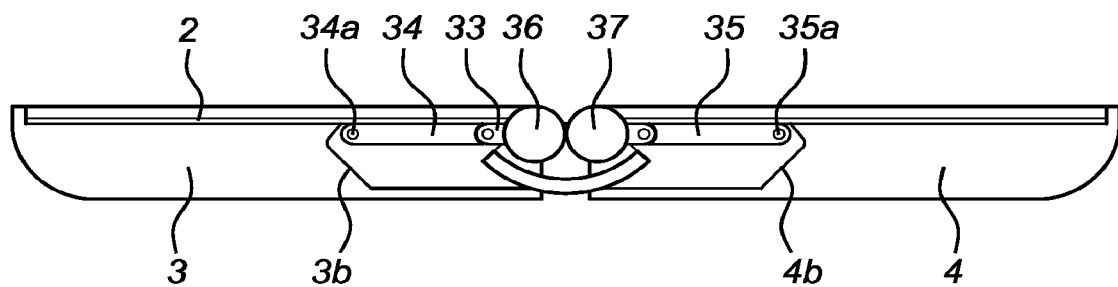
Figure 8C:
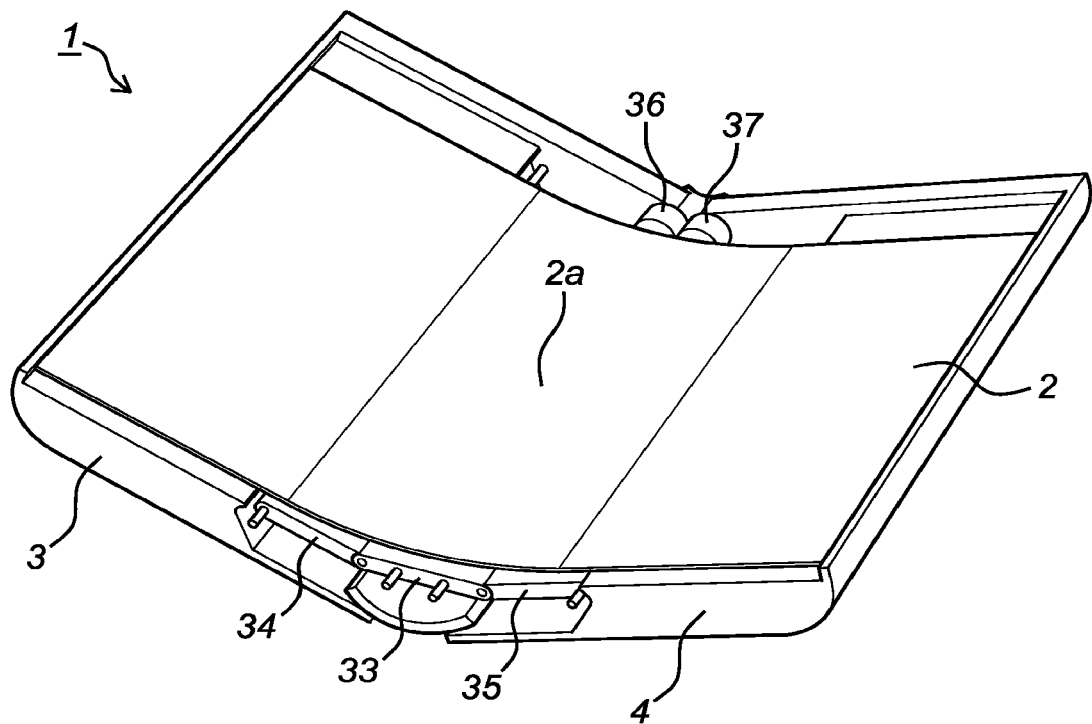
Figure 8D:
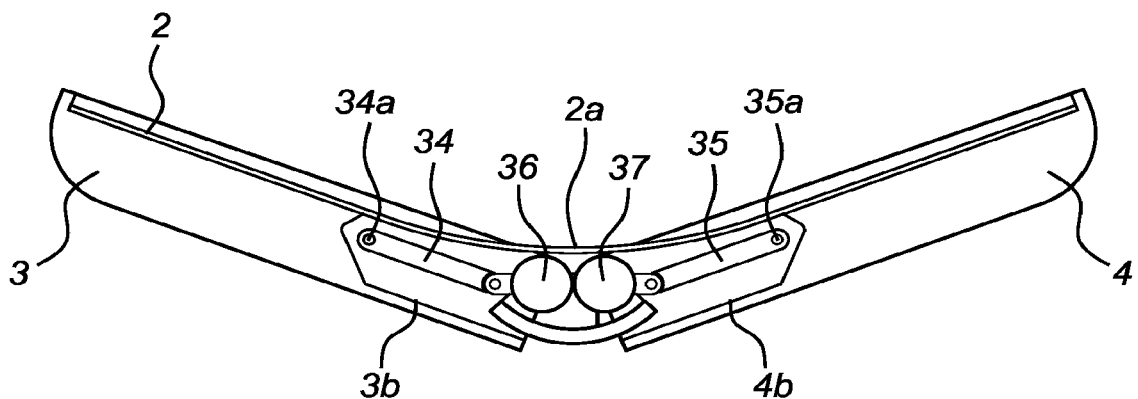
Figure 8E:
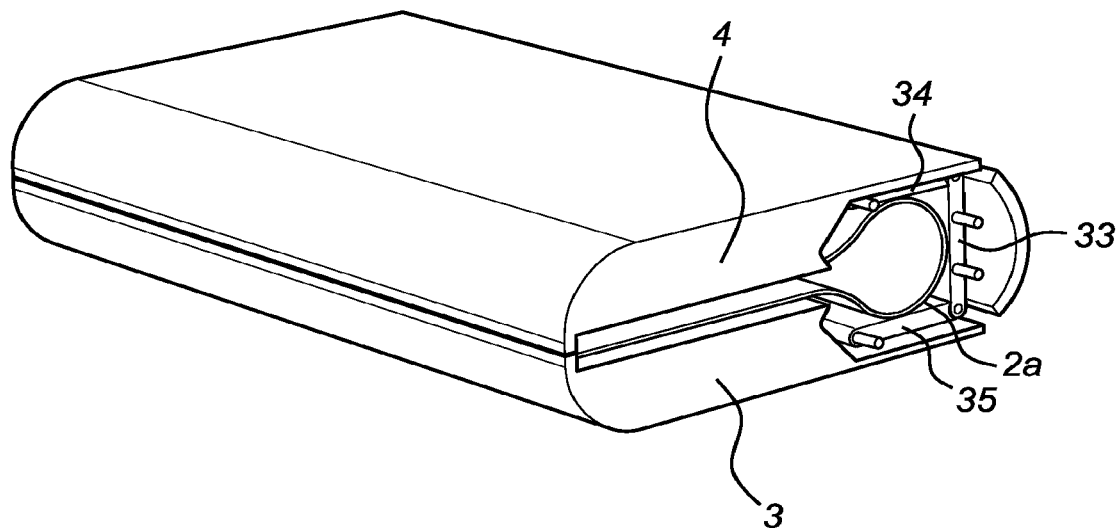
Figure 8F:
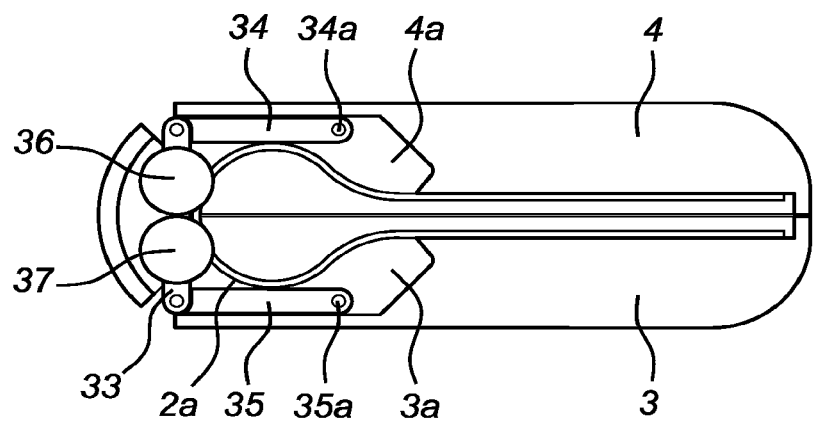

In the embodiment shown in FIGS. 8a-8f in a 'book' display system 1 the central display segment 2a is supported by additional display supports comprising a central support plate 33 and two hingeably connected display support plates 34, 35. The central support plate 33 is used as dual guided hinge part for the two display supports 3, 4 which are coupled by gears 36, 37. The gears are rotatable around the respective hinge axis and connected with the respective display support and act as a movement synchronizing coupling between both book halves and enable a synchronized rotating of the main display supports 3, 4 at substantially equal but oppositely directed angles and synchronized movement of the additional display supports 33, 34 and 35. The support plates 34, 35 each have a pin 34a, 35a that is guided in a slot 3b, 4b respectively, in each of the display supports 3, 4 of the device body. These slots 3b, 4b guide the movement of the plates 34, 35 in such a manner that in open position of FIGS. 8a and 8b the display segment 2a is completely supported and in closed position of FIGS. 8e and 8f the curved display segment 2a is not obstructed. FIGS. 8c and 8d show an intermediate situation. Preferably in the closed position the plates 33, 34 and 35 facilitate by their positioning a predefined curvature of the display segment 2a with an advantage for the lifetime of the display.

Figure 9A:
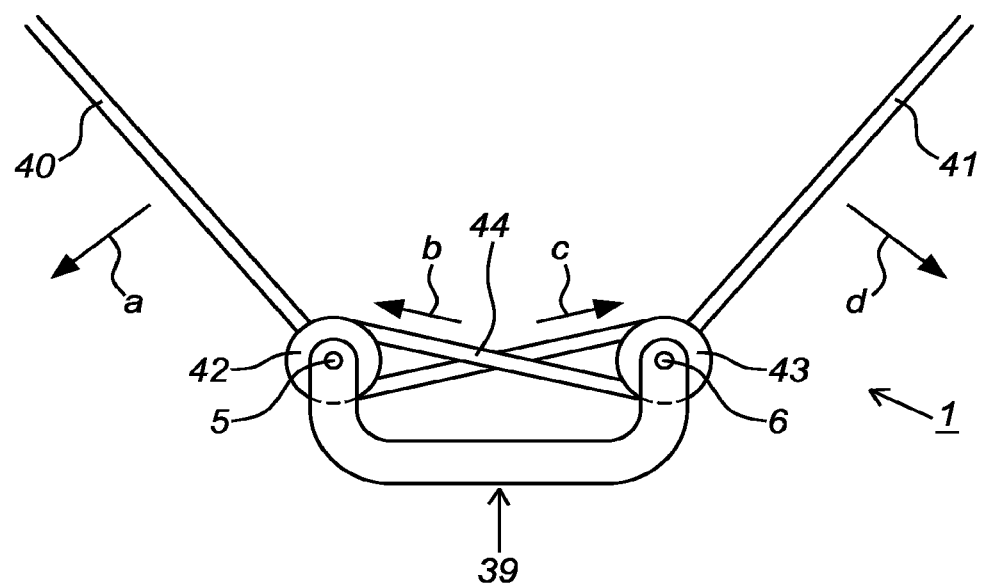
FIGS. 9a-9b show a schematic view of a part of another 'book' or 'wrap' embodiment in a side view (FIG. 9a) and a top view (FIG. 9b), respectively, in accordance with the invention.
Figure 9B:
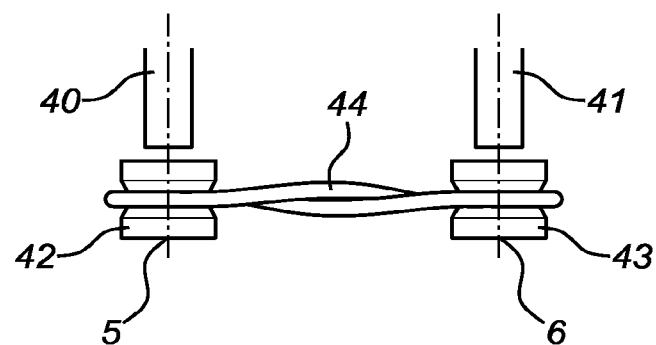

The embodiment schematically shown in FIGS. 9a and 9b shows relevant parts of a 'book' display system 1 with a hinge mechanism 39 and main display supports 40, 41. These main supports are hingeably connected via hinges 5, 6 like the supports in the preceding embodiments. The hinges 5, 6 are the axle for pulleys or wheels 42, 43 connected to the support 40, 41 respectively. The pulleys are guiding a spring or belt 44. As shown in FIG. 9b the belt is guided on a crossing way such that the combination of pulleys 42, 43 and belt 44 couples the supports 40, 41 for rotation in opposite directions and acts as a movement synchronizing coupling between both book halves and the additional support plates (not shown). Opening of the left support 40 in FIG. 9a in the direction of arrow a results into movement of the belt 44 near the pulley 42 in the direction b, of the belt near the pulley 43 in the direction c and thus in an opening of the right support 41 in the direction d with the same degree of opening of both supports 40, 41.

Figure 10:
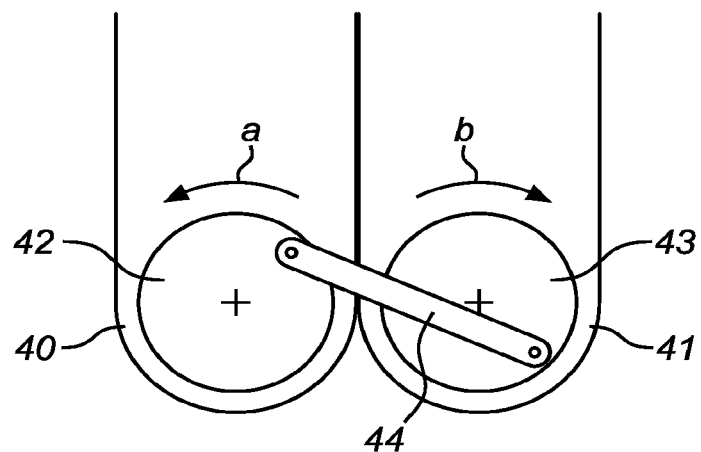
FIGS. 10, 11 show a schematic side view of part of two other 'book' or 'wrap' embodiments in a closed position, in accordance with the invention.
Figure 11:
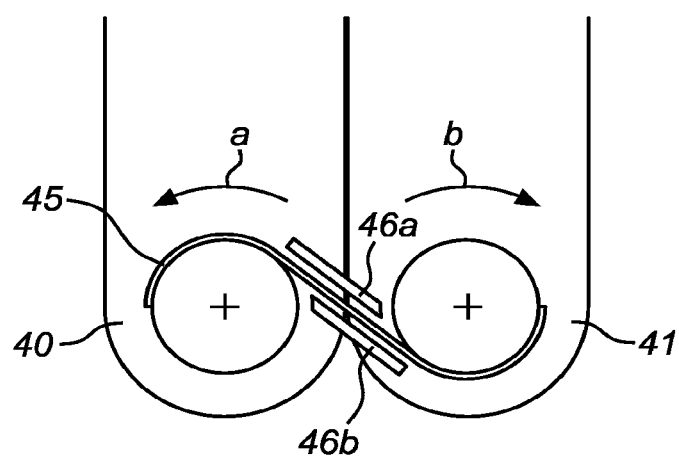

The embodiments schematically shown in FIGS. 10 and 11 show alternative solutions for the synchronized coupling of the book halves in opposite directions in the embodiment of FIGS. 9a-9b. In FIG. 10 an alternative solution is shown with a connecting rod 44 between the wheels 42, 43. In FIG. 11 another alternative solution is shown with a connecting belt 45, guided between guiding walls 46a, 46b.

Figure 12A:
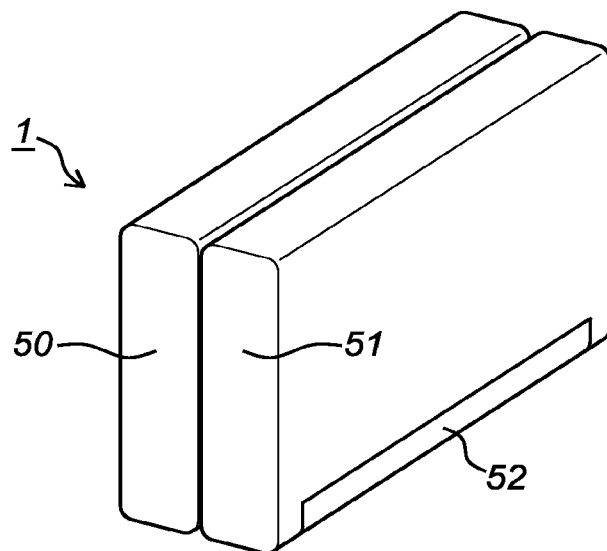
FIGS. 12a-12g show a perspective view of another 'book' embodiment in an closed position (FIG. 12a), in an open position (FIG. 12b), as well as a view of parts of the movement synchronizing coupling in this embodiment (FIGS. 12c-12g) in accordance with the invention.
Figure 12B:
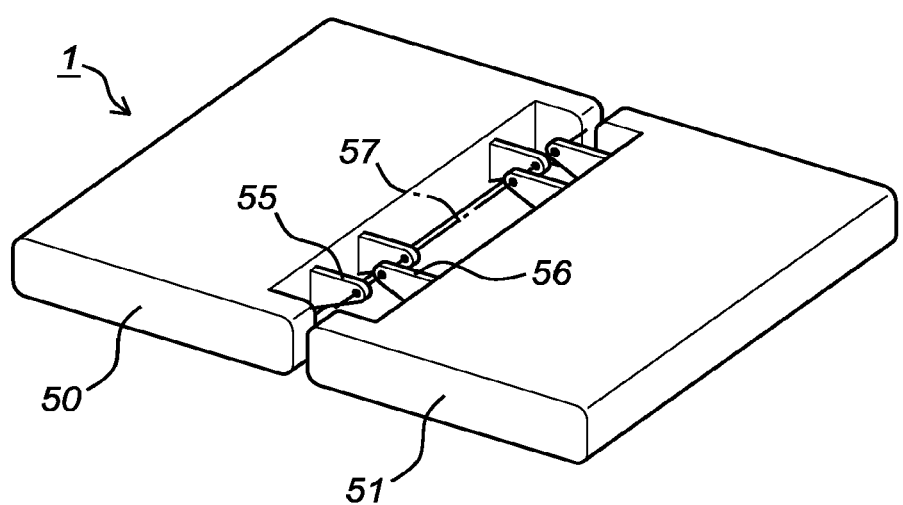
Figure 12C:
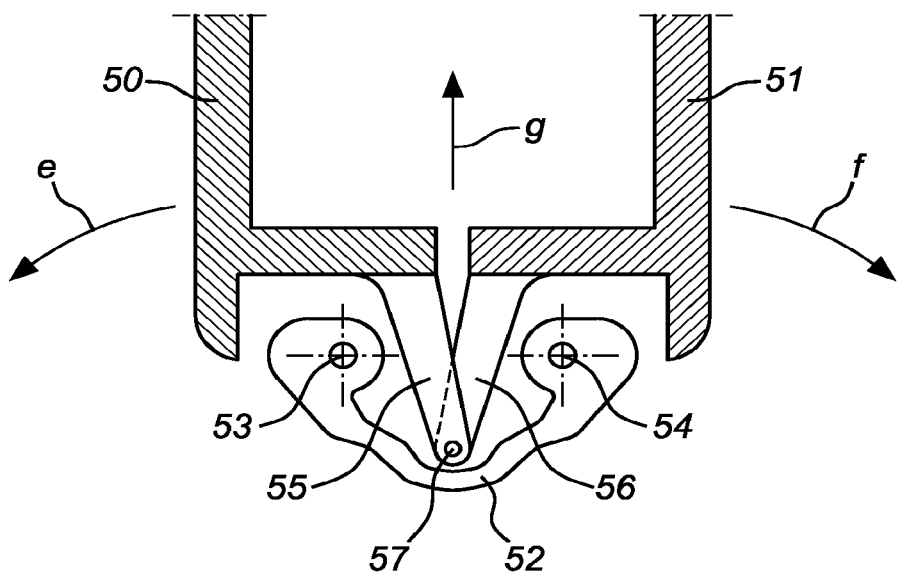
Figure 12D:
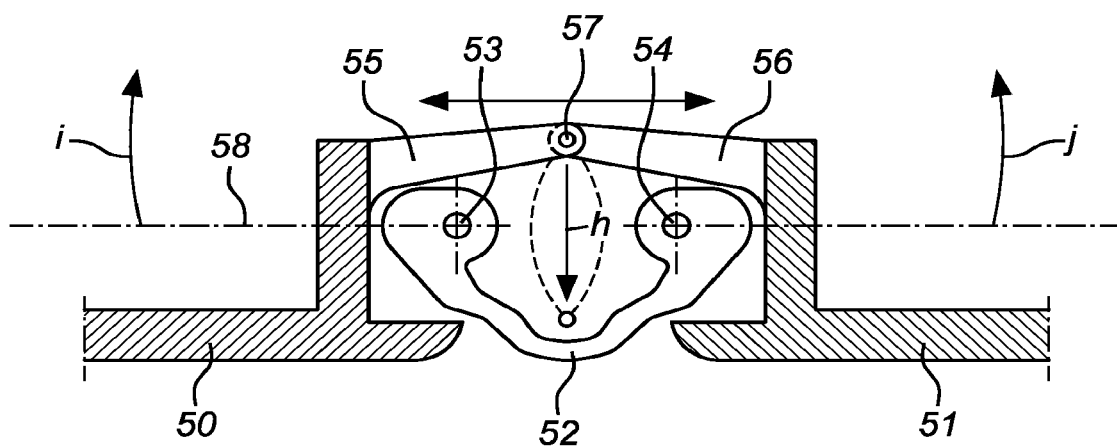
Figure 12E:
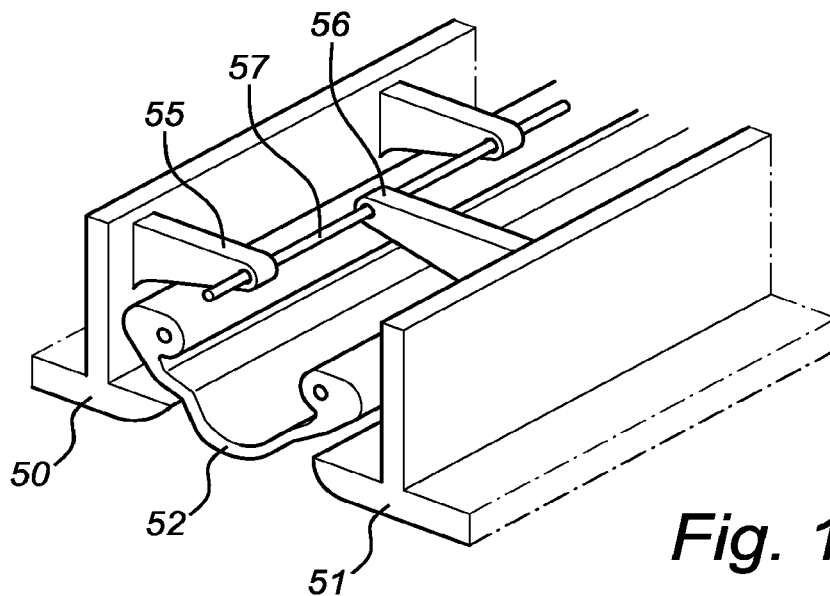
Figure 12F:
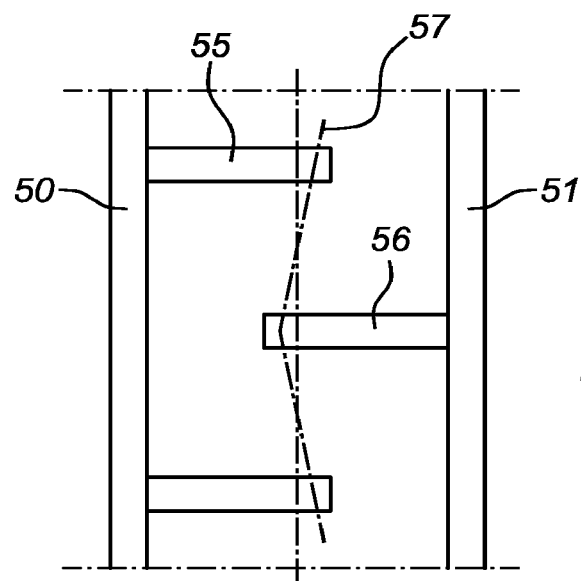
Figure 12G:
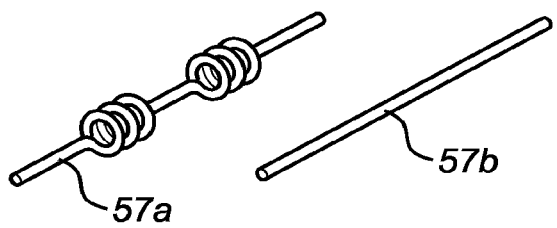

In the embodiment shown in FIGS. 12a-12g the display system 1 comprises two book halves 50, 51, connected by a hinge mechanism 52 with at both ends parts two hinges 53, 54. The book halves 50, 51 are provided in the hinge area with teeth or extensions 55, 56 with free ends located substantially halfway between the book halves. An elongated spring 57 extends between the end parts of the hinge mechanism 52. As shown in detail in FIGS. 12e, 12f the spring 57 is guided through holes near the free ends of the teeth 55, 56. As shown in FIG. 12g by way of example, the spring 57 may be configured as a coil spring 57a or a spring wire 57b. Opening of the book halves 50, 51 in FIG. 12a to the open position of FIG. 12b results in a synchronized movement of both book halves 50, 51 in the direction of arrow e, f respectively shown in detail in FIG. 12c and a movement of the spring in the direction of arrow g. Halfway the spring moves through a plane 58 comprising hinge axes of hinges 53, 54 and expands under its spring force in the direction of arrow g (comparable with the working of an over center mechanism). The spring 57 forces via the teeth 55, 56 the book halves 50, 51 to make the same rotation and thus the same degree of opening. The same synchronization is obtained during the movement from the open position of FIG. 12d towards the closed position of FIG. 12c in the direction of arrow h in FIG. 12d. In this way the teeth 55, 56 and the spring 57 act as a movement synchronizing coupling between both book halves, which move in the direction of arrows i and j respectively. In a way not shown also in this embodiment the additional display supports of the preceding embodiments may be applied, with a synchronized movement due to their connection with the movement synchronizing coupling.

The detailed drawings, specific examples and particular formulations given, serve the purpose of illustration only. Furthermore, other substitutions, modifications, changes, and omissions may be made in the design, operating conditions, and arrangement of the exemplary embodiments without departing from the scope of the invention as expressed in the appended claims.

What is claimed is:

1. A display system comprising:
   a flexible display;
   a first main display support and a second main display support configured to support the flexible display;
   a hinge mechanism configured to rotatably connect the first main display support and second main display support so that the flexible display is folded in a closed position and unfolded in an open position; and
   an additional display support comprising a first side support plate, a second side support plate, and a central support plate, the additional display support being configured to support a central segment of the flexible display in the open position,
   wherein the first side support plate and the second side support plate are disposed between the first main display support and the second main display support,
   wherein the central support plate is disposed between the first side support plate and the second side support plate and is pivotably connected to the first side support plate and the second side support plate, and
   wherein, during movement of the first main display support and the second main display support from the closed position to the open position, the central support plate is moved vertically upward with respect to a portion of the hinge mechanism while simultaneously the first side support plate and the second side support plate are moved downward with respect to the hinge mechanism.

2. The display system of claim 1, wherein the additional display support is pivotably connected to the first main display support and second main display support.

3. The display system of claim 1,
   wherein the additional display support further comprises a first support plate and a second support plate movably connected to the central support plate, and
   wherein the first support plate and the second support plate are pivotably connected to the first main display support and the second main display support, respectively.

4. The display system of claim 3, wherein a first end of the central support plate is pivotably connected to a first end of the first side support plate and a second end of the central support plate is pivotably connected to a first end of the second side support plate.

5. The display system of claim 1,
   wherein the central support plate moves in one direction toward the flexible display while the flexible display is being unfolded, and
   wherein the central support plate moves in a direction opposite to the one direction while the flexible display is being folded.

6. The display system of claim 1, wherein the central support plate, the first side support plate, and second side support plate support the central display segment so that the central display segment is bent at a pre-defined curvature in the closed position.

7. The display system of claim 1, wherein the hinge mechanism comprises a first hinge axis and a second hinge axis that rotatably connect the first main display support and the second main display support, respectively.

8. The display system of claim 1, wherein, during movement of the first main display support and the second main display support from the open position to the closed position, the central support plate is moved vertically downward with respect to the portion of the hinge mechanism while simultaneously the first side support plate and the second side support plate are moved upward with respect to the hinge mechanism.

* * * * *